March 7, 1939.   C. W. MacMILLAN   2,149,302
SIGHTING DEVICE FOR HEADLIGHT TESTING APPARATUS
Filed Sept. 20, 1937   2 Sheets-Sheet 1

INVENTOR.
Charles W. MacMillan
BY Parker & Burton
ATTORNEYS.

Patented Mar. 7, 1939

2,149,302

UNITED STATES PATENT OFFICE 2,149,302

SIGHTING DEVICE FOR HEADLIGHT TESTING APPARATUS

Charles W. MacMillan, Detroit, Mich., assignor to Hinckley-Myers Company, Jackson, Mich., a corporation of Michigan Application September 20, 1937, Serial No. 164,613

3 Claims. (Cl. 33—46)

This invention relates to a sighting or aligning device for testing apparatus and more particularly to a sighting device for properly positioning a headlight testing apparatus in front of a motor vehicle.

To properly test and measure the direction, intensity, and other factors of headlight illumination, it is important to dispose the testing apparatus in proper alignment in front of the automobile. Testing elements of the apparatus should be disposed in parallel alignment with the longitudinal median line of the vehicle. If the apparatus is not squared-up in this manner before testing operations are performed, certain inaccuracies will be present in the measurement.

An important object of this invention is to provide a simple, compact, and collapsible sighting device for headlight testing equipment which is capable of aligning the equipment in front of the headlight by sighting on any suitable part of the motor vehicle. Heretofore, as in the application of George M. Graham, Serial No. 82,419 filed May 29, 1936, and George M. Graham and Charles W. MacMillan, Serial No. 150,726 filed June 28, 1937, headlight testing equipment has been squared-up in front of motor vehicles by special tire engaging elements. The present invention eliminates the need for such elements and in its stead provides an adjustable device which is capable of sighting along any part of the vehicle at a distance remote from the testing elements of the apparatus. The device is constructed in a novel way so that it is movable to an infinite number of positions within a given radius of the apparatus and in a plane at a predetermined angle to the alignment of the testing elements. The device is capable, for example, of sighting down the center of the hood of a motor vehicle, while the apparatus is disposed in front of either the right or left front headlight. Special means is provided for shifting the apparatus while the operator sights upon the center of the motor vehicle. After the apparatus has been adjusted to a proper position in front of a headlight, it may be locked in position on the floor by any suitable device.

Figure 1:
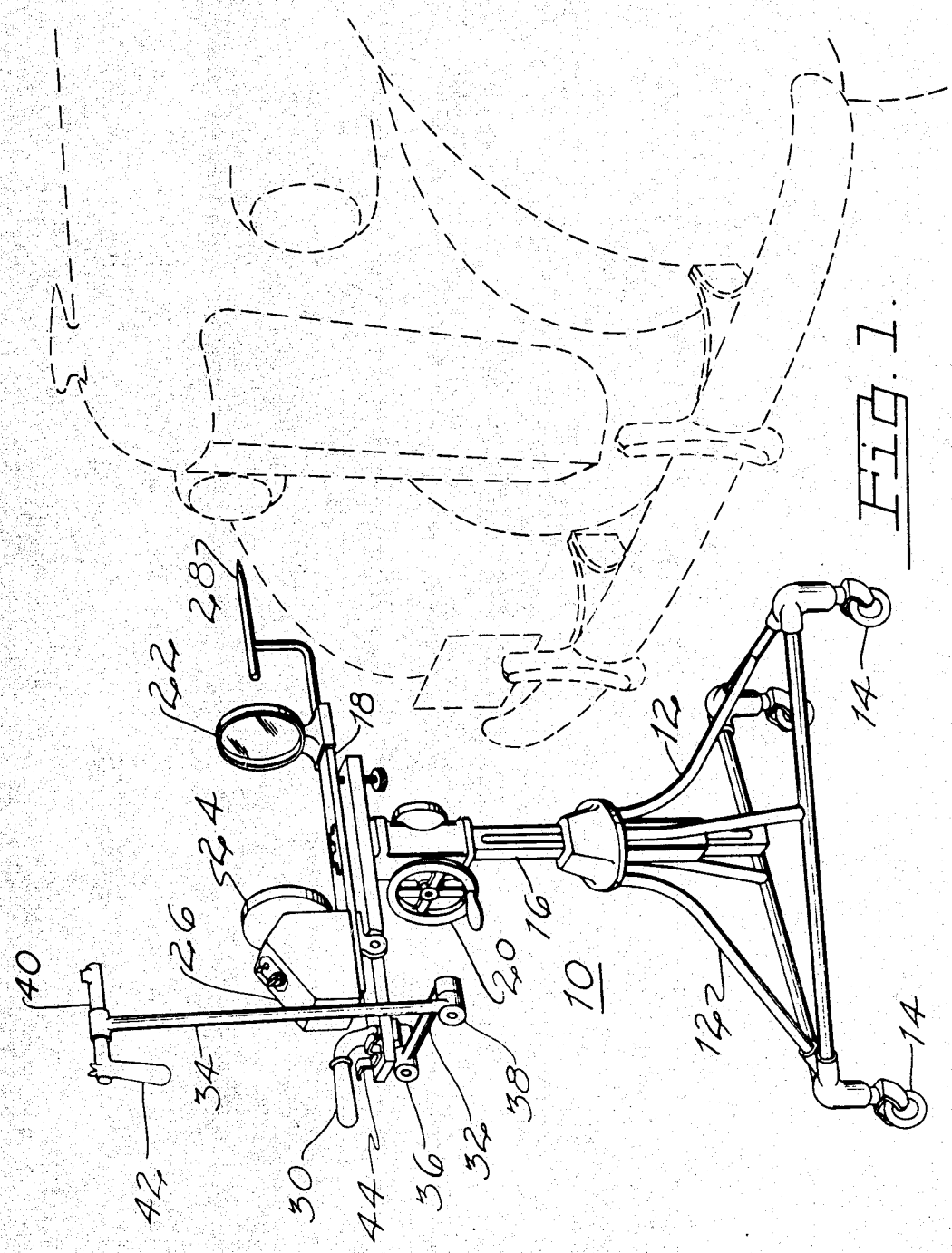
Figure 2:
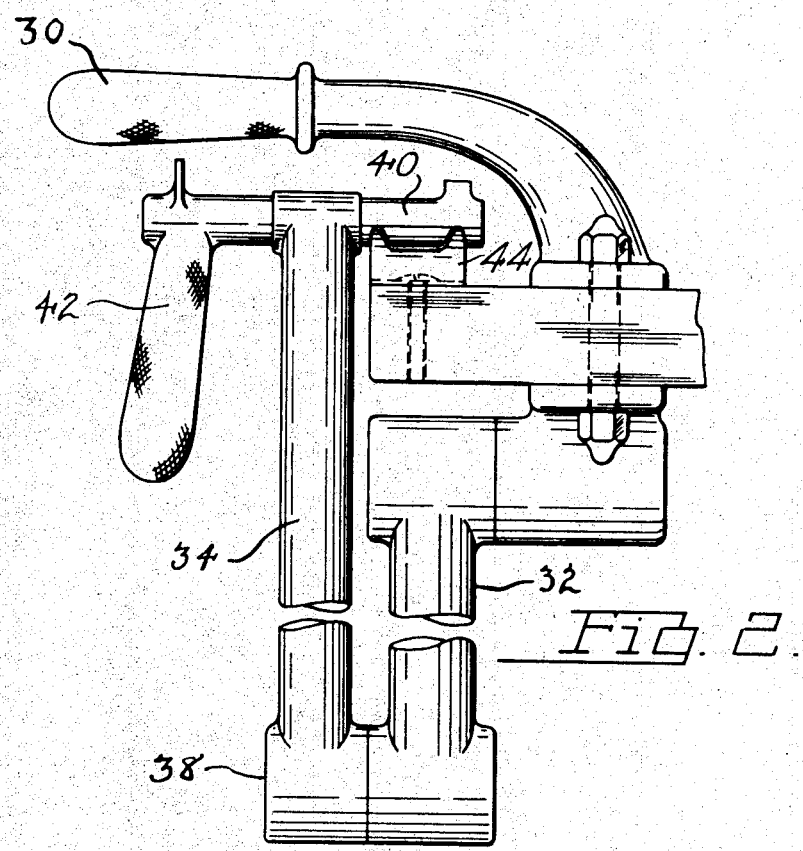
Figure 3:
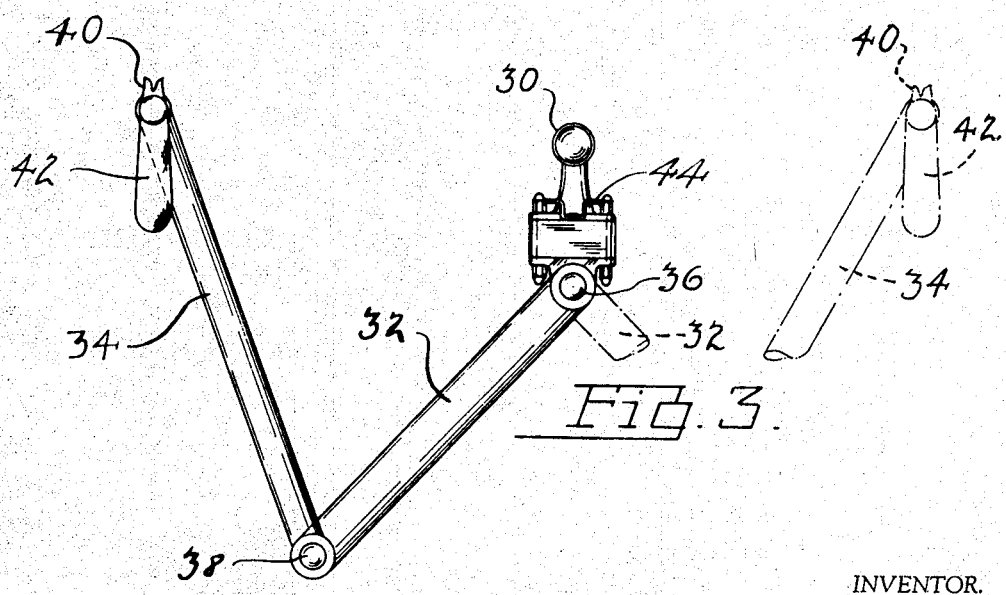

Other objects, advantages, and meritorious features of this invention will become more fully apparent from the following specification, appended claims, and the accompanying drawings wherein:

Figure 1 is a perspective view of the testing apparatus and the sighting device carried thereby showing the manner in which the same is disposed in front of a motor vehicle for headlight testing purposes, Figure 2 is a side detailed view of the sighting device and the means for releasably locking the same in folded position, Figure 3 is a back view of the sighting device and the support on the apparatus to which it may be removably secured, Referring to Figure 1, the apparatus comprises an upright or standard generally indicated at 10, including spaced apart legs 12 and castors 14 for supporting the same as is clearly apparent in Figure 1. The center post 16 supports a substantially horizontal support or bar 18 upon which headlight testing instrumentalities are disposed in alignment. The post 16 is capable of raising and lowering the bar 18 and the instrumentalities supported thereby by means of a screw mechanism described and claimed in the aforesaid application of George M. Graham and Charles W. MacMillan, Serial No. 150,726. The hand wheel 20 is capable upon rotation in one direction to raise the bar 18 and upon rotation in the opposite direction it will lower the bar. Bar 18 may be pivotally connected to the upright 16 for adjustment about a horizontal axis as shown in the above referred application.

In the embodiment of the invention illustrated herein, the testing instrumentalities carried upon the bar 18 comprises a condensing lens 22, a disc-shaped screen 24 and a unitary housing structure 26 in which light sensitive electric mechanism is housed. Screen 24 is disposed at approximately the focal point of the condensing lens. Means is preferably provided for hinging the screen 24 to the support 18 so that it may be swung downward out of the light rays condensed by the lens. An aperture is provided in the housing 26 through which the condensed rays of light will enter when the screen is swung downward out of the path of the rays. The testing elements 22, 24, and 26, are therefore disposed in an alignment parallel to the axis of the lens 22. This assembly of testing elements is described and claimed in the application of George M. Graham and Charles W. MacMillan above referred to.

At the front end of the support 18 there is a pointer element 28 which is adapted to center the axis of the lens upon the center of the headlight as is clearly apparent. At the rear end of the support 18, a handle 30 is provided which the operator may clasp to move or turn the apparatus upon the castors 14.

The novel sighting device associated with this apparatus comprises two or more pivotally connected rigid arms 32 and 34. Two of these arms are shown in the drawings, but it is obvious that if necessary more arms may be added to extend the field of the sighting device. As shown in Figures 1 and 2, arm 32 is pivotally connected to the support 18 at 36 about an axis parallel to the axis upon which the testing elements 22, 24, and 26 are disposed. The other end of arm 32 is pivotally connected to arm 34 about an axis 38 which likewise extends parallel to the axis upon which the testing elements are disposed. The free end of arm 34 carries a sighting mechanism 40 which comprises a rod-shaped member journaled in the end of arm 34 and carrying sights at the front and rear ends thereof. A handle 42 is attached to the rear end of the rod 40 for facilitating the sighting operations. The sighting device 40 projects in a line likewise parallel to the alignment of the testing elements on a support 18. As a result, irrespective of where the sighting device 40 may move, the sights carried thereby extend in an alignment parallel to that of the testing elements 22, 24, and 26.

As shown in Figures 1 and 2, a resilient U-shaped clip 44 is secured to the top of the support 18 at the rear end thereof. This clip is shaped to receive and hold the sighting rod 40 as is indicated in Figure 2. The arms 32 and 34 are made of unequal lengths so that when they are collapsed or swung to folding position the sighting rod 40 will be offset from the axis 36. In the embodiment of the invention illustrated herein, arm 34 is slightly longer than arm 32, sufficient to allow the sighting rod 40 to swing between the handle 30 and the support 18 into yieldable engagement with the clip 44. When in non-use, the rod 40 is swung until it is releasably held by the clip 44 in which position the arms 32 and 34 will extend parallel in side-by-side relationship. From this position, the sighting rod 40 may be swung either to the right or to the left from the clip 44 depending upon which side of the apparatus it is desired to make the sighting operation.

In operation, the headlight testing apparatus is disposed in approximately the proper position in front of the motor vehicle. The sighting device is then released from retention by the clip 44 and the operator swings the sighting rod to a position which will enable him to sight along any suitable part of the motor vehicle which extends longitudinally of the vehicle. A suitable part of the vehicle is the middle of the top of the hood. The operator clasps the handle 30 with one hand and the handle 42 of the sighting rod with the other hand. By judicious movement of handle 30 he can finely adjust the apparatus in front of the headlight until the part of the vehicle on which he is sighting falls properly in line with the sights on the sighting rod. When this has been accomplished, the apparatus may be locked in such adjusted position by means of any suitable locking mechanism associated with the castors 14 on the bottom part of the apparatus. After the apparatus has been adjusted properly, testing operations may be performed by the testing elements on the support 18.

When the testing operations are completed on one headlight, the apparatus is wheeled in front of the other headlight. The sighting device may be swung to the other side of the apparatus for sighting purposes by collapsing the arms of the device and passing the sighting rod 40 between the handle 30 and supporting bar 18. The same operations are pursued as described above for testing this headlight.

What I claim is:

1. A headlight testing apparatus for motor vehicles comprising, in combination, a support carrying headlight testing instrumentalities disposed in alignment, a device for lining said instrumentalities in proper position in front of a headlight of a motor vehicle by sighting on a part of the motor vehicle remote from the headlight, said device including a pair of rigid arms pivotally connected together at one of their ends about an axis extending parallel to the axis of alignment of the headlight testing instrumentalities, means pivotally connecting a free end of one of said arms to said support about an axis extending parallel to the axis of alignment of said headlight testing instrumentalities, and a clip carried by said support adapted to engage a part of the other arm adjacent to its free end and to releasably hold the arms in folded condition adjacent to said support.

2. A headlight testing apparatus for motor vehicles comprising, in combination a support carrying headlight testing instrumentalities disposed in alignment, a device for lining said instrumentalities in proper position in front of a headlight of a motor vehicle by sighting upon a part of the motor vehicle remote from the headlight, said device including a pair of rigid arms pivotally connected together at one end, means pivotally connecting a free end of one of said arms to said support, sighting means projecting laterally from the free end of the one arm, said arms being of unequal length whereby the two arms may be folded into parallel side-by-side relationship with the sighting means disposed offset to the pivotal connection of the other arm, and a clip carried by said support adapted to engage the projecting sighting means and to releasably hold the same and the arms in folded position adjacent to the support.

3. A headlight testing apparatus for motor vehicles comprising, in combination, a support carrying headlight testing instrumentalities disposed in alignment, a device for lining said instrumentalities in proper position in front of a headlight of a motor vehicle by sighting upon a part of the motor vehicle remote from the headlight, said device including a pair of rigid arms pivotally connected together at one end, means pivotally connecting a free end of one of said arms to the underside of the rear end of said support, a sighting element carried by the free end of the other arm and projecting laterally forwardly thereof, said last-mentioned arm being offset rearwardly of the rear end of said support and having a longer length than the other arm sufficient to carry the projecting sighting element over the top of said support in which position the two arms will be folded together in side-by-side relationship, and means on top of said support adapted to engage the sighting element and releasably hold the same and the arms in folded position adjacent to the support.

CHARLES W. MacMILLAN.